May 22, 1956 E. B. JAQUES 2,746,127
DESCALING WHEEL
Filed March 6, 1953 2 Sheets-Sheet 1
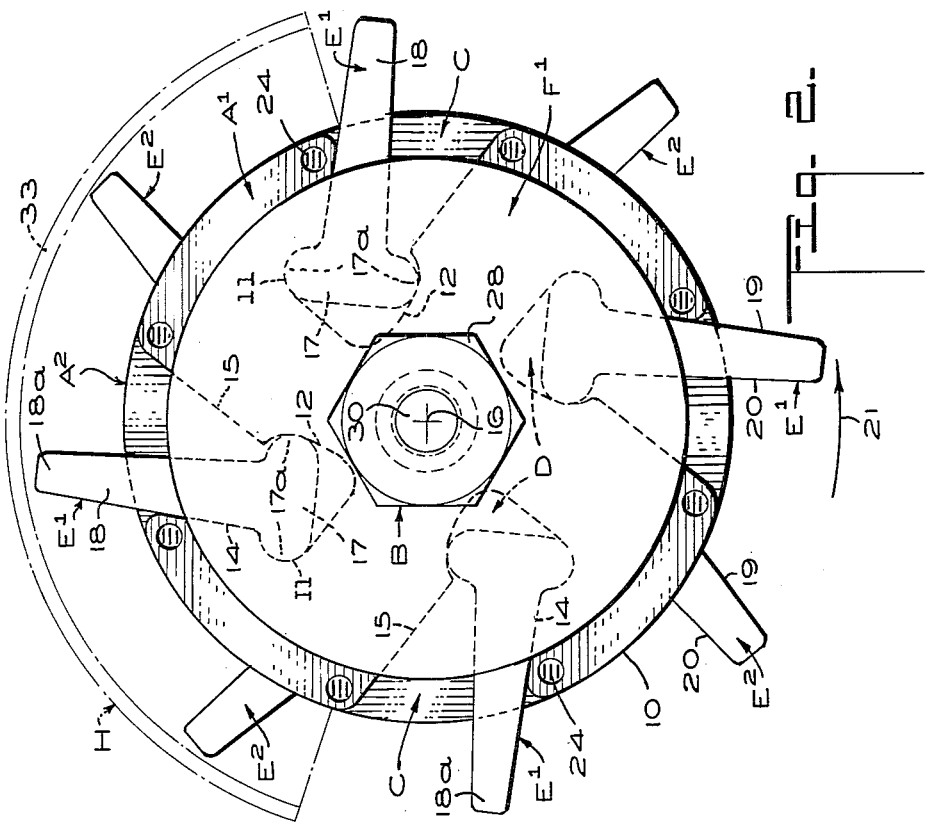
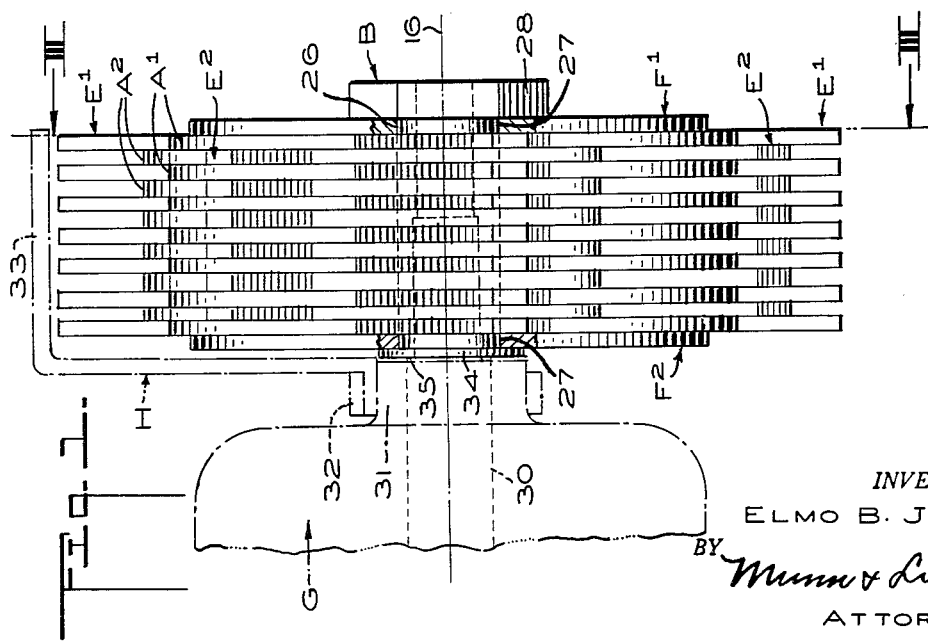
INVENTOR.
ELMO B. JAQUES
BY Munn & Liddy
ATTORNEYS

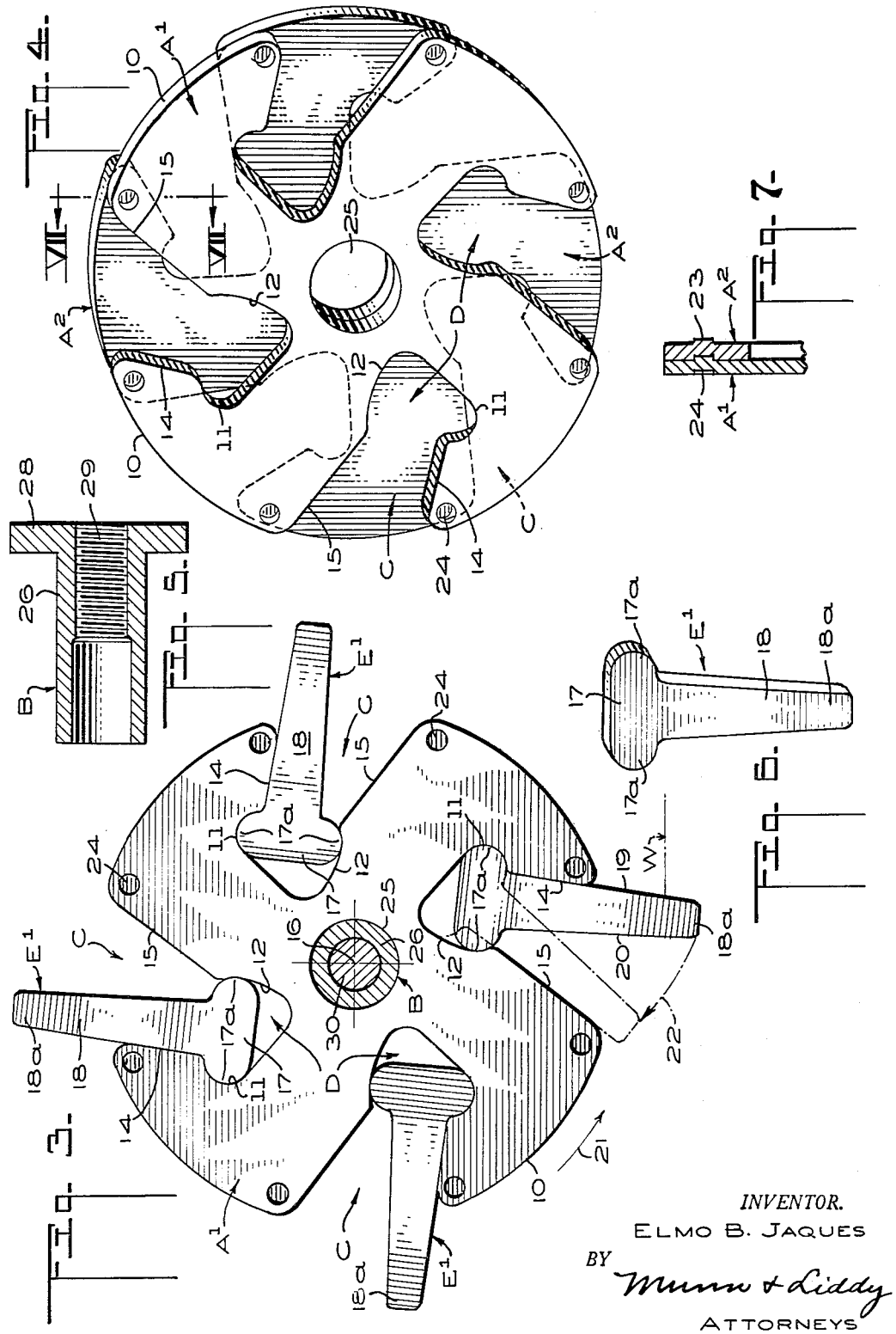

United States Patent Office 2,746,127
Patented May 22, 1956

2,746,127
DESCALING WHEEL

Elmo B. Jaques, Long Beach, Calif., assignor to Descaling Equipment Co. Inc., Long Beach, Calif., a corporation of California Application March 6, 1953, Serial No. 340,809

4 Claims. (Cl. 29—81)

The present invention relates to improvements in a descaling wheel, which is adapted for removing scales, rust and other foreign material from plates, pipes, tanks, decks and hulls of ships, etc., all with great rapidity and ease of operation.

It is proposed in this invention to provide a device of the character described, in which a series of plates may be assembled into a laminated body, with each plate having at least one swingably-mounted hammer interlocked therewith by the plate itself. Accordingly, screws, bolts, pins, or other fastening means, are not required for anchoring the hammers to the plates. Thus, the various parts of the descaling wheel may be assembled, or dismantled, with the minimum of effort.

Moreover, and as a further object, the over-all length of the descaling wheel may be varied, merely by assembling more or less plates and hammers in the laminated body in order to fulfill the requirements. Generally speaking, this result is accomplished by fashioning all of the plates identical with one another, and further providing hammers of uniform construction. In this manner, a preselected number of plates may be secured upon a special nut or hub member. After each plate is placed upon this member, the hammers for that particular plate are inserted into peripheral recesses in the plate and swingably interlocked with the latter.

Other objects and advantages will appear as the specification continues. The novel features will be pointed out in the claims hereunto appended.

Drawings

For a better understanding of the invention, reference should be made to the accompanying drawings, forming part of this application, in which:

Figure 1 is a side elevational view of my descaling wheel, with a drive motor and a protective guard for the wheel being shown by dot-dash lines;

Figure 2 is an end view of the same descaling wheel;

Figure 3 is a sectional view taken along the transverse plane III—III of Figure 1;

Figure 4 is an oblique view of two of the plates arranged in abutting and assembled relation;

Figure 5 is a longitudinal sectional view taken through the special nut or hub member;

Figure 6 is an oblique view of one of the hammers; and

Figure 7 is a vertical sectional view taken along the line VII—VII of Figure 4, disclosing a projection on one plate extending into engagement with a depression in an adjacent plate.

While I have shown only the preferred embodiment of my invention, it should be understood that various changes, or modifications may be made within the scope of the annexed claims without departing from the spirit thereof.

Detailed description

In carrying out my invention, I provide a plurality of rotatable plates A1 and A2 of the shape shown in Figures 3 and 4. These plates are adapted to be assembled on a special nut or hub member B to provide a laminated body for a descaling wheel, as illustrated in Figures 1 and 2. In reality, all of these plates are identical with one another, the reference character A1 being used to designate alternate plates, and A2 the intervening plates. Accordingly, a detailed description of one plate will suffice for all.

Each plate defines a marginal rim 10 having at least one recess C extending thereinto from its rim. It will be noted that four of these recesses have been fashioned in each plate, but I do not desire to be limited in this respect.

As clearly shown in the drawings, the walls of the inner portion of each recess C are reentrantly shaped to provide an enlarged socket D, providing a semi-cylindrical bearing 11 at one side of the socket and a curved rail 12 at an opposing side thereof. Moreover, the plates have spaced-apart confronting walls 14 and 15 defining the outer portion of each recess C, which converge inwardly relative to one another toward the socket D. The latter walls are disposed non-radially with respect to an axis of rotation 16 of the assembled plates, and both converge toward the same offset side of this axis.

It will be seen that hammers E1 and E2 are mounted in the recesses C of the plates A1 and A2, respectively. All of these hammers are T-shaped and identical with each other. Moreover, they are mounted for swinging movement in the general plane of the plate in which they are arranged. Referring to Figures 2, 3 and 6, each hammer has been disclosed as defining a cross-bar 17 and a stem 18. The opposite ends 17a—17a of the cross-bar are semi-cylindrical, with one end thereof being interlocked for pivotal movement in the bearing 11 and the other end being slidably guided along the curved rail 12. The stem of each hammer projects beyond the rim 10 of the plates to provide an abrading end 18a.

Both ends 17a—17a of the cross-bar of each hammer are identical with one another, whereby the hammer may be reversed to thereby interchange the leading and trailing edges 19 and 20, respectively, when the abrading end wears due to engaging with work piece W (see Figure 3). In this connection, it should be understood that the plates are rotated as a unit in the direction of the arrow 21.

As the plates are thus rotated, centrifugal force will cause the inner ends of the hammers to swing in the bearings 11 until the leading edges 19 abut the outer wall portions 14 of the recesses, as shown by full lines in Figure 3. However, as each hammer strikes against the work piece W, it will rebound toward the outer wall portion 15 of its recess, as suggested by the arrow 22 in Figure 3, thereby moving the hammer toward its dot-dash line position in this view.

With particular reference to Figure 4, it will be observed that the recesses C in alternate plates A1 are staggered relative to those in the intervening plates A2, with alternate plates forming walled barriers over lateral sides of the recesses in the intervening plates and vice versa. This arrangement will hold the hammers in their respective recesses in the laminated descaling wheel. Each plate has at least one projection 23 extending from a face thereof into engagement with a depression 24 in a face of an adjacent plate (see Figure 7) to thereby preclude the assembled plates from rotating relative to one another.

All of the plates are fashioned with bores 25 therein, which are dimensioned to telescopically receive a cylindrical portion 26 of the hub member B upon assembling the laminated body. Moreover, outboard and inboard discs F1 and F2, respectively, are adapted to be placed on opposite ends of the laminated body, as shown in Figure 1, these discs being provided with bores 27—27 of a diameter to fit over the hub portion 26.

As shown in Figures 1, 2 and 5, the hub member B has an enlarged head 28 thereon arranged for bearing against the out-board disc F1 of the assembled descaling wheel. The bore of this member has been provided with threads 29 therein for securing the member B to a driven shaft 30. The direction of these threads is such as to cause the hub member to tighten upon the shaft 30 when the latter rotates.

It will be appreciated, of course, that any suitable means may be resorted to for operating the shaft 30, such as a flexible drive. However, for this purpose, a motor G has been disclosed in Figure 1. As a safety feature, a guard H has been secured to a hub 31 of the motor by a clamp 32, and an arcuate flange 33 on this guard covers the upper part of the descaling wheel.

Reference is made to Figure 1, wherein this view shows a washer 34 as being interposed between the inboard disc F2 and a shoulder 35 formed on the shaft 30. Upon tightening the hub member B, all of the plates A1—A2 and discs F1—F2 are clamped upon this shaft so as to be rotated thereby as a unit.

Assembly and operation

The assembling of the various parts of the descaling wheel may be accomplished in the following manner:

Initially, the outboard disc F1 is telescoped over the cylindrical portion 26 of the hub member B, followed by one of the plates A1. At this time, it will be found advisable to hold this disc and plate horizontally, with the head 28 resting on a supporting surface and the cylindrical portion of the hub projecting vertically.

Next, a hammer E1 is inserted into each of the recesses C in the plate A1 now disposed on the hub member from a lateral position of this plate, and with opposite ends 17a—17a of the cross-bar 17 engaging with the bearings 11 and curved rail 12, respectively, and the stem 18 of the hammer extending outwardly through the recess between the confronting wall portions 14—15 of the latter.

Thereafter, one of the intervening plates A2 is telescoped downwardly over the cylindrical portion 26 of the hub member, care being taken to stagger its recesses C with respect to the recesses in the previously-applied plate A1, as shown in Figure 4. Furthermore, the projections 23 on the plate A2 just applied are engaged with the depressions 24 in the first applied plate A1. Another set of hammers E2 are inserted into the plate A2 now embracing the hub member B in the same manner as previously described.

These steps are repeated until the desired number of alternate and intervening plates A1 and A2, respectively, together with their hammers, have been assembled on the hub member. Thereupon, the inboard disc F2 is lowered over the hub member. Upon threading the latter upon the shaft 30, with the washer 34 being interposed between the disc F2 and the shoulder 35, the special nut or hub member B is tightened to clamp the laminated body of the descaling wheel upon the driven shaft.

In actual practice, the hammers are made slightly thinner than the plates A1—A2, thereby allowing freedom of swinging movement of the former relative to the latter.

It will be apparent that when the descaling wheel is rotated in the direction of the arrow 21, centrifugal force will cause the hammers to swing ouwtardly until they come to rest against the leading wall positions 14, as shown in Figure 3. As each successive hammer strikes against the work piece W, it will abrade the latter, with the hammer swinging toward the trailing wall portion 15.

The descaling wheel herein described will clean badly rusted pitted plates at a high rate of speed, without requiring any steel brushing afterwards. The hammer will pass over and clean around rivets, seams and the like, causing no appreciable vibration of the descaling wheel.

The above described units have been used successfully for descaling ships' hulls. The usual method is to suspend a movable sheave (not shown) above the operator, supporting a light rope or small cable having a counterweight on one end, the opposite end being atttached to the descaling unit. This eliminates any lifting by the operator, causing less fatigue for the latter.

After using the unit for a reasonable time, it is advisable to examine the condition of the hammers E1—E2. If inspection reveals too much of a radius on the abrading ends 18a of the hammers, causing them to lose some of their effectiveness, the descaling wheel should be disassembled. Then as the wheel is assembled again, the hammers are reversed or turned over, thereby placing the smaller radius facing the leading or hammer-striking edge.

This procedure is usually repeated several times before the hammers are worn badly or have become ineffective. The laminated wheel body will maintain itself to a point of wearing out a number of sets of hammers.

I claim:

1. In a descaling wheel: a series of rotatable plates abutted one against the other to provide a laminated body; each plate defining a marginal rim, and having at least one recess extending thereinto from its rim; the recesses in alternate plates being staggered relative to those in the intervening plates, with alternate plates forming walled barriers over lateral sides of the recesses in the intervening plates and vice versa; the walls of the inner portion of each recess providing an enlarged socket; and a hammer swingably mounted in each recess for movement in the general plane of the plate in which the recess is fashioned; the inner end of each hammer being swingably interlocked in the enlarged socket of its respective plate by the walls of that socket; the hammers having outer abrading ends projecting beyond the rims of the plates.

2. In a descaling wheel: a series of rotatable plates abutted one against the other to provide a laminated body; each plate defining a marginal rim, and having at least one recess extending thereinto from its rim; the recesses in alternate plates being staggered relative to those in the intervening plates, with alternate plates forming walled barriers over lateral sides of the recesses in the intervening plates and vice versa; the walls of the inner portion of each recess providing an enlarged socket; and a hammer swingably mounted in each recess for movement in the general plane of the plate in which the recess is fashioned; the inner end of each hammer being swingably interlocked in the enlarged socket of its respective plate by the walls of that socket; the hammers having outer abrading ends projecting beyond the rims of the plates; each plate having at least one projection extending from a face thereof into engagement with a depression in a face of an adjacent plate to thereby preclude the assembled plates from rotating relative to one another.

3. In a descaling wheel: a series of rotatable plates abutted one against the other to provide a laminated body; each plate defining a marginal rim, and having at least one recess extending thereinto from its rim; the recesses in alternate plates being staggered relative to those in the intervening plates, with alternate plates forming walled barriers over lateral sides of the recesses in the intervening plates and vice versa; the walls of the inner portion of each recess providing an enlarged socket; a hammer swingably mounted in each recess for movement in the general plane of the plate in which the recess is fashioned; the inner end of each hammer being swingably interlocked in the enlarged socket of its respective plate by the walls of that socket; the hammers having outer abrading ends projecting beyond the rims of the plates; the plates being fashioned with aligned bores therein; and a hub member extending through these bores upon which the plates are mounted.

4. In a descaling wheel: a series of rotatable plates abutted one against the other to provide a laminated body; each plate defining a marginal rim, and having at least one recess extending thereinto from the rim; the recesses in alternate plates being staggered relative to those in the intervening plates, with alternate plates forming walled barriers over lateral sides of the recesses in the intervening plates and vice versa; and a hammer swingably disposed in each recess for movement in the general plane of the plate in which the recess is fashioned; and means swingably anchoring the inner ends of the hammers with the plates; the hammers having outer abrading ends movable into positions beyond the rims of the plates.

References Cited in the file of this patent

UNITED STATES PATENTS

| | | |
|---|---|---|
| 462,157 | Pederson | Oct. 27, 1891 |
| 874,258 | Stormer | Dec. 17, 1907 |
| 1,328,034 | Coe | Jan. 13, 1920 |

FOREIGN PATENTS

| | | |
|---|---|---|
| 286,101 | Germany | July 22, 1915 |
| 345,799 | Great Britain | Apr. 2, 1931 |
| 357,009 | Great Britain | Sept. 17, 1931 |